United States Patent

Goodwin, III

[11] Patent Number: 5,987,426
[45] Date of Patent: Nov. 16, 1999

[54] POINT-OF-SALE SYSTEM INCLUDING ISOLATION LAYER BETWEEN CLIENT AND SERVER SOFTWARE

[75] Inventor: John C. Goodwin, III, Suwanee, Ga.

[73] Assignee: NCR Corporation, Dayton, Ohio

[21] Appl. No.: 08/949,410

[22] Filed: Oct. 14, 1997

[51] Int. Cl.$^6$ .......................... G06F 151/00; G06F 17/60
[52] U.S. Cl. ............................... 705/21; 705/16; 705/17; 709/203
[58] Field of Search .................................. 705/16, 17, 21; 709/203

[56] References Cited

U.S. PATENT DOCUMENTS

| | | |
|---|---|---|
| 4,855,908 | 8/1989 | Shimoda et al. . |
| 5,541,925 | 7/1996 | Pittenger et al. . |
| 5,710,887 | 1/1998 | Chelliah et al. . |
| 5,745,705 | 4/1998 | Iguchi . |
| 5,839,116 | 11/1998 | Goodwin, III ............................ 705/20 |

*Primary Examiner*—Krisna Lim
*Attorney, Agent, or Firm*—Paul W. Martin

[57] ABSTRACT

A system and method of transferring information between a first software application and a second software application which employ an isolation layer. The system includes a client computer system provided by a first seller of computer systems, including a client software application, and a server computer system provided by a second seller of computer systems different from the first seller of computer systems, including a server software application which provides information from the server computer system to the client computer system. The system additionally includes isolation layer software, either at the client computer system or at the server computer system, which facilitates communication between the client software application and the server software application to transfer the information.

8 Claims, 5 Drawing Sheets

POINT-OF-SALE SYSTEM INCLUDING ISOLATION LAYER BETWEEN CLIENT AND SERVER SOFTWARE

CROSS-REFERENCE TO RELATED APPLICATIONS

The present application is related to the U.S. Pat. No. 5,839,116 issued on Nov. 17, 1998, entitled "SYSTEM AND METHOD OF OBTAINING INFORMATION FROM A PRICE LOOK-UP FILE", and having as inventor, John Goodwin.

BACKGROUND OF THE INVENTION

The present invention relates to point-of-sale (POS) systems, and more specifically to a POS system including an isolation layer between POS server software and a client POS application program.

POS systems typically include a central server and a plurality of checkout terminals connected through a client-server network.

The checkout terminals include bar code readers and keyboards for entry of the item numbers during a transaction.

The central server stores a price look-up (PLU) file which associates item numbers with item prices. The central server processes requests from the checkout terminals for price information for the items. The central server may perform additional tasks, such as storing transaction history (audit log and transaction totals history), storing accountability totals, storing cashier and terminal accountability totals, holding future price change information (batches), performing credit authorization, performing check validation, and performing frequent shopper validation and specials.

POS checkout software has traditionally included client and server software that have been developed together and sold as a single proprietary product. However, this solution may not be an optimal one for a retailer. Retailers may find that combining server software from one developer with client software from another developer gives their POS systems the features that they want. This may be especially true for retailers that want the best solutions for both the server and client software in a market where no one developer of proprietary POS software exceeds at both.

Therefore, it would be desirable to provide a POS system including an isolation layer between the POS server software and the POS client application software to enable server and client software from different developers to be combined.

SUMMARY OF THE INVENTION

In accordance with the teachings of the present invention, a POS system including an isolation layer between POS server software and a client POS application program is provided.

A system and method of transferring information between a first software application and a second software application which employ an isolation layer. The system includes a client computer system provided by a first seller of computer systems, including a client software application, and a server computer system provided by a second seller of computer systems different from the first seller of computer systems, including a server software application which provides information from the server computer system to the client computer system. The system additionally includes isolation layer software, either at the client computer system or at the server computer system, which facilitates communication between the client software application and the server software application to transfer the information.

The method includes the steps of providing the first software application by a first company, providing the second software application by a second company different from the first company, executing the first software application by a first computer, executing the second software application by a second computer different from the first computer, providing an isolation layer having hooks into the second software application, executing the isolation layer, and establishing communication between the first software application and the second software application by the isolation layer to transfer the information.

It is accordingly an object of the present invention to provide a POS system including an isolation layer between POS server software and a client POS application program.

It is another object of the present invention to allow server and client software from different developers to be combined using an isolation layer.

It is another object of the present invention to provide an isolation layer for server software that provides read and write services for client POS software in a computer network that includes client computers running different client POS software.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
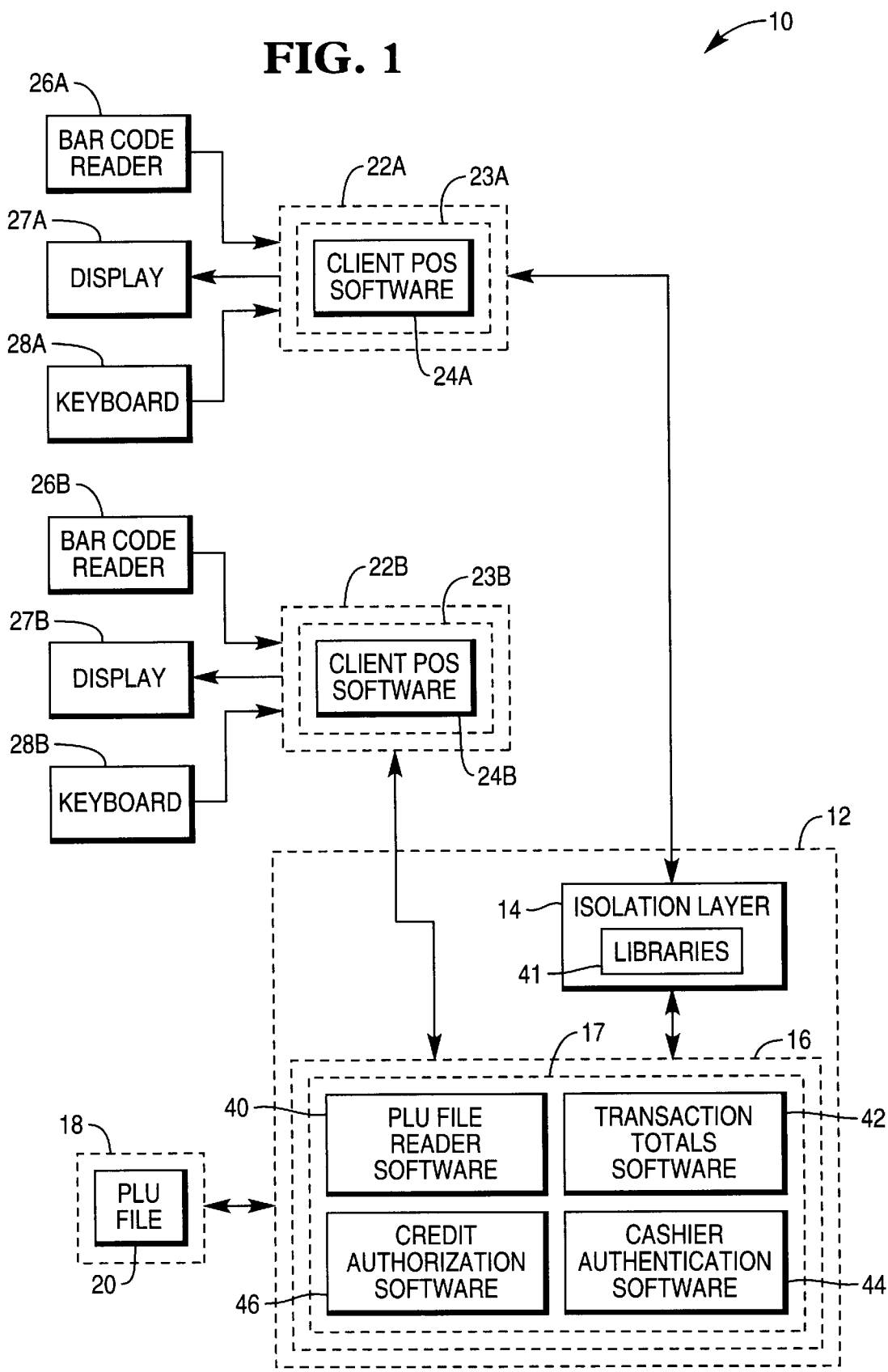
FIG. 1 is a block diagram of a transaction management system.

Referring now to FIG. 1, transaction system 10 preferably includes host computer system 12 and point-of-service (POS) terminals 22A and 22B. Host computer system 12 and point-of-service (POS) terminals 22A and 22B are coupled together to form a network.

POS terminals 22A and 22B execute independent applications 23A and 23B, including client POS software 24A and 24B for completing transactions. POS software 24A and 24B may be identical (e.g. the same application from the same developer) or may be different transaction processing applications.

As illustrated, independent applications 23A were developed by a different developer than the developer of server POS software 16. Thus, independent applications 23A require isolation layer 14 to communicate with POS server software 16. Independent applications 23B were developed by the same developer as the developer of POS server software 16. Thus, independent applications 23B do not require isolation layer 14 to communicate with server POS software 16. Advantageously, the present invention is capable of connecting a plurality of independent applications 23A running on a plurality of different client terminals from different developers to server POS software 16.

Client POS software 24A and 24B display transaction information on displays 27A, 27B. Client POS software 24A and 24B receive article identification information from bar code readers 26A, 26B and keyboards 28A, 28B. Client POS software 24A and 24B send the article identification information to host computer system 12. Host computer system 12 reads price look-up (PLU) file 20 to obtain price information and sends the price information to POS terminals 26A and 26B.

Other examples of independent applications 17 include price checking software for consumer price checking computers, weighing software for electronic scales, price checking software and item description label printing software for hand-held terminals, and EPL auditing software.

Host computer system 12 executes POS server software 16 and isolation layer 14. POS server software 16 processes requests from independent applications 23A and 23B. POS server software 16 includes system specific applications 17, such as price look-up (PLU) file software 40, transaction totals software 42, cashier authentication software 44, and credit checking software 46. These are but examples of system specific software in use today. The present invention anticipates other types of system specific software 17 as well.

Isolation layer 14 provides translation services between independent applications 23A and server POS software 16. Thus, isolation layer 14 allows client POS software 24A from one developer to function with system specific applications 17 from a different developer.

Isolation layer 14 may reside in host computer system 12 or client terminal 22A. Typically, a provider of client terminals 22A also provides independent applications 23A, and a provider of host computer system 12 also provides server POS software 16.

If the provider of client terminals 22A is adding client terminals 22A to an existing network including a server from a different provider, the provider of client terminals 22A may wish to write and store isolation layer 14 in client terminals 22A.

On the other hand, if a provider of servers and server POS software 16 is adding host computer system 12 to an existing network including client terminals 22A from a different provider, the provider of servers may wish to write and store isolation layer 14 in host computer system 12.

Isolation layer 14 preferably includes one library file for all system specific applications 17 or individual library files for system specific applications 17. Use of multiple libraries adds network design flexibility but penalizes operation by loading each library into memory, even if only part of isolation layer 14 is used. Isolation layer 14 may take other forms including a single application, a single driver, or multiple drivers that perform read operations into server POS software 16 in order to obtain and map information to be used by client POS software 24A. These drivers also perform writes into server POS software 16 map information created by client POS software 24A.

Storage medium 18 stores PLU file 20 and other information files and is preferably a fixed disk drive.

Figure 2:
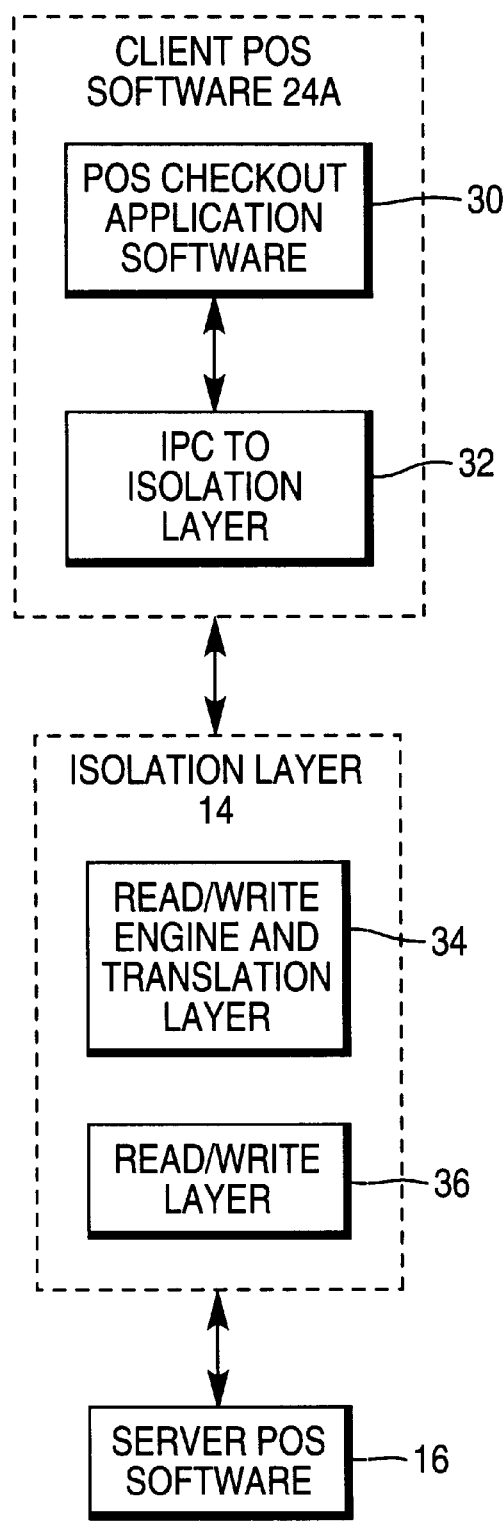
FIG. 2 is a block diagram illustrating the client POS software, server POS software, and the isolation layer between them.

Turning now to FIG. 2, the software architecture within system 10 is described in more detail. Discussion references client POS software 24A, but other independent applications 23A operate in a similar fashion.

Client POS software 24A includes POS checkout application software 30 and interprocess communications (IPC) software 32. POS checkout software 30 records items by scanning them, prints them on a receipt, and adds their prices to produce a total transaction amount. POS checkout software 30 also performs specific transaction-related functions, such as processing food stamps and other forms of payment under government entitlement programs, calculating service charges, performing price change functions, performing out of transaction functions (loans, pickups), etc. An example of POS checkout software 30 is the UNITY® checkout application developed and sold by the Assignee of the present invention.

IPC software 32 is software that is added to POS checkout software 30 to facilitate interprocess communications (IPC) between POS checkout software 30 and isolation layer 14. IPC software 32 will vary with operating system, from threads, queues, named pipes, shared files, sockets, etc.

Isolation layer 14 includes read/write engine and translation layer 34 and read/write layer 36. Read/write engine and translation layer 34 translates one request into one or more read/write requests as needed for host computer system 12 based on standard server inputs and custom outputs. Read/write layer 36 performs the actual reads and writes to host computer system 12 based on the requests issued in read/write engine and translation layer 34.

An example of read/write layer 36 is the UNITY® file service layer.

Server POS software 16 may include both the UNITY® file service layer and the UNIX® file system.

In a traditional POS system, client POS software communicates directly with POS server software through a communication methodology, such as named pipes. Under Applicant's invention, client POS software 24A is modified to include IPC software 32, and an isolation layer 14 is added. Communication between client POS software 24A and POS server software 16 occurs between IPC software and isolation layer 14.

Figure 3:
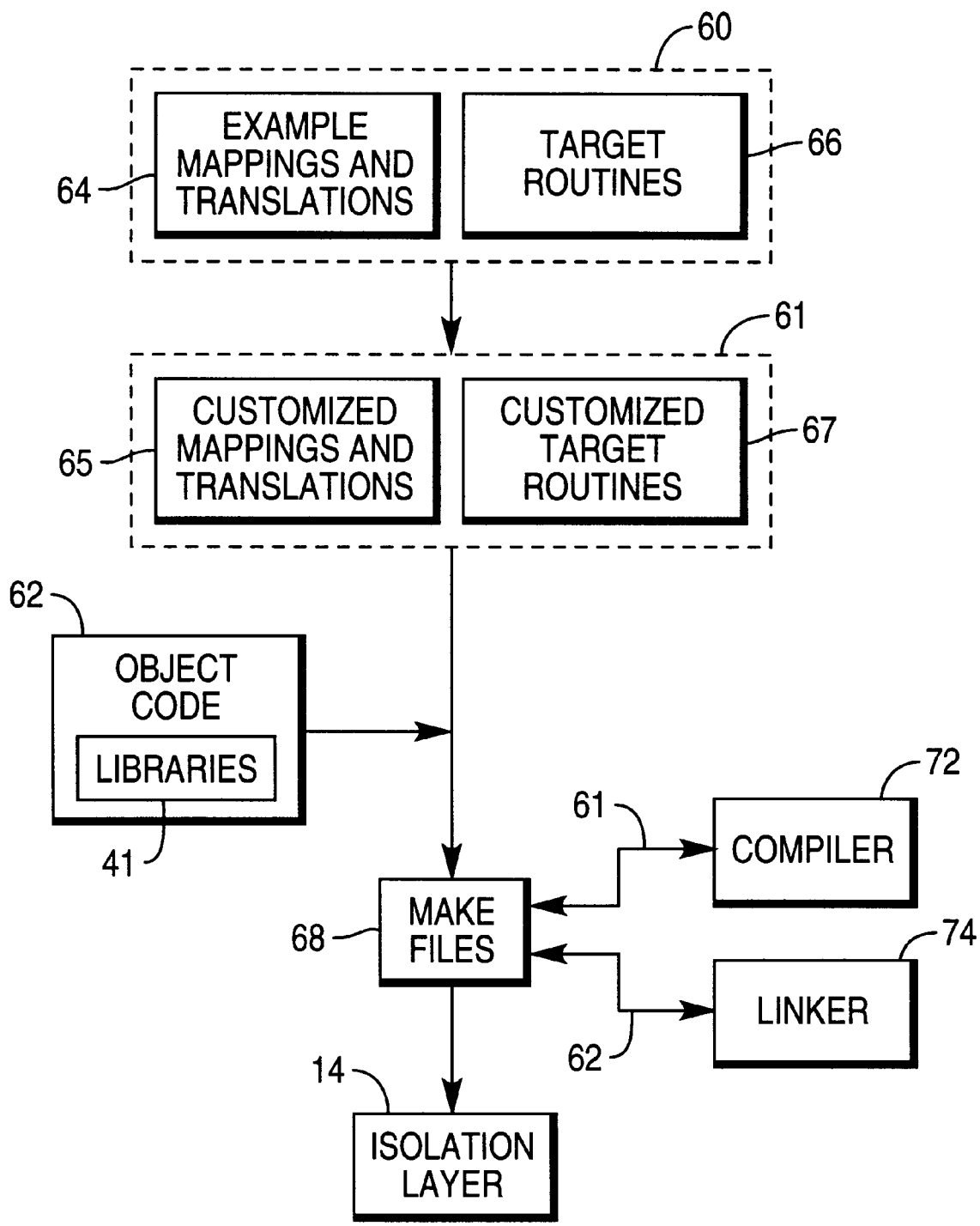
FIG. 3 is a block diagram of a system for producing the isolation layer.

Turning now to FIG. 3, the components that are used to construct isolation layer 14 include templates 60, object code 62, example mappings and translations 64, target routines 66, and make files 68 for each of system-specific applications 17. Templates 60 are a super set of example mappings and translations 64 and target routines 66. Isolation layer 14 includes templates 60 for each of system specific applications 17. Example mappings and translations 64 and target routines 66 are edited and customized by developers to produce customized mappings and translations 65 and customized target routines 67 (customized templates 61). Customized mappings and translations 65 and customized target routines 67 along with object code 62 are fed into make files 68 in order to produce executable code for isolation layer 14.

Object code 62 consists of libraries 41 for each of system specific applications 17. As mentioned above, isolation layer 14 may include one library for establishing communication for all system specific applications 17 or a plurality of separate libraries.

Example mappings and translations 64 provide non-displayable information (in code and/or in documentation) and may be edited to customize isolation layer 14.

Target routines 66 are system specific application routines that may be edited and customized to suit the needs of the target transaction establishment.

Make files 68 are files that pass source code (templates 60) through compiler 72 and then pass object code 62 through linker 74 to produce the target executable.

Figure 4:
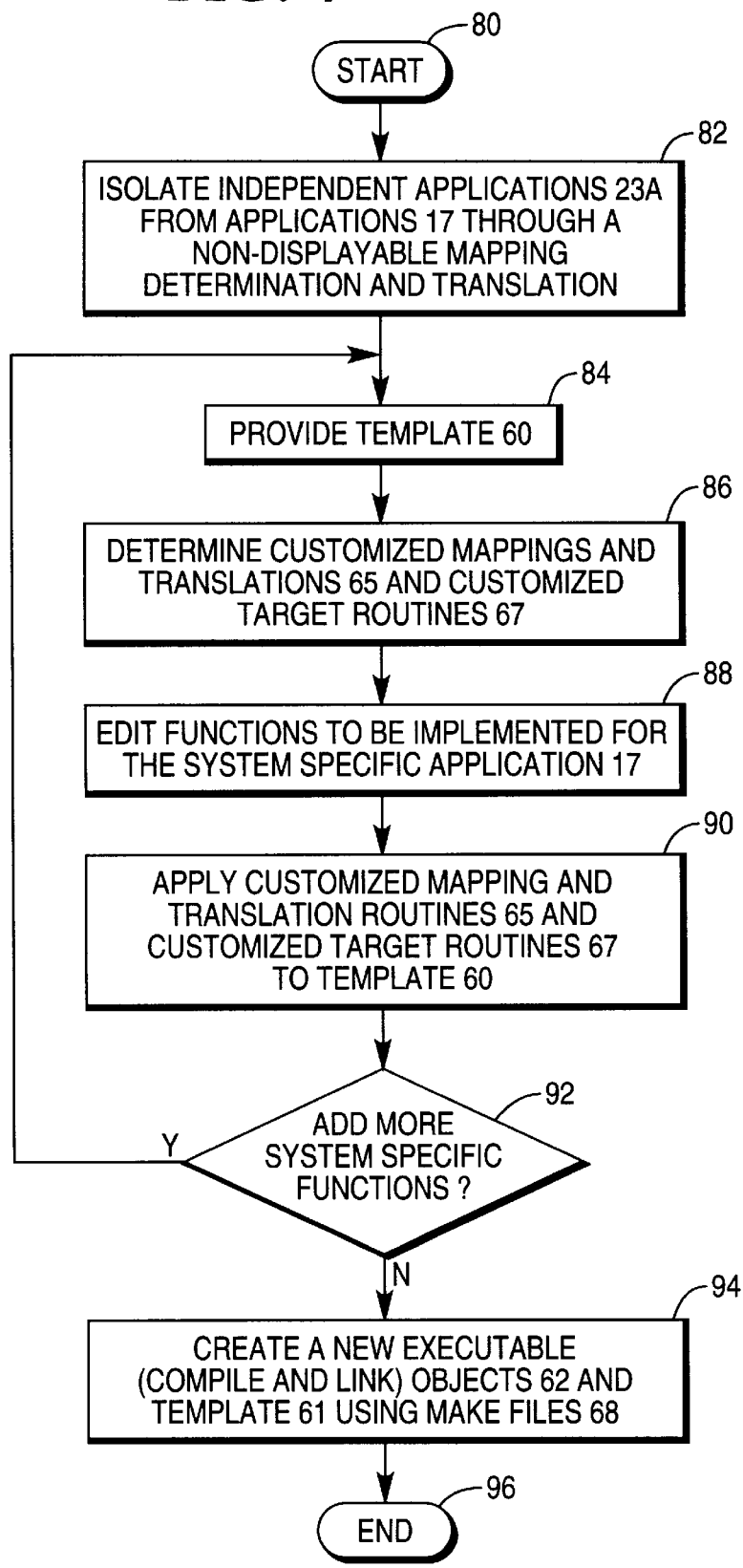
FIG. 4 is a flow diagram illustrating how the isolation layer is created.

Turning now to FIG. 4, the method of creating isolation layer 14 begins with START 80.

In step 82, independent applications 23A are isolated from system specific applications 17 through a non-displayable mapping determination and translation process. Example mappings and translations 64 result.

In steps 84, a template 60 for one of system specific applications 17 is provided. Template 60 is packaged in an installable format that can then be distributed and installed on the target system.

In step 86, customized mappings and translations 65 and customized target routines 67 are determined.

In steps 88–92, customized template 61 is produced by changing template 60 to reflect customized mappings and translations 65.

In step 88, functions to be implemented are edited. For example, for PLU file reader software 40, the "read first", "read next", and "read specific" sections are edited. The "read first" section is a routine that must be completed/customized to read the first PLU in PLU file 20. The "read next" section is a routine that must be completed/customized to read the next PLU in PLU file 20 sequentially. The "read specific" section is a routine that must be completed/customized to read a specific PLU file record.

In step 90, customized mapping and translations 65 and customized target routines 67 derived from step 86 are applied to template 60.

In step 92, operation returns to step 84 if library functionality for an additional specific application 17 must be added. Otherwise, operation continues to step 94.

In step 94, a new executable (isolation layer 14) is compiled and linked from object code 62 and templates 61 for each of system specific applications 17 using make files 68, compiler 72, and linker 74.

In step 96, the method ends.

Figure 5:
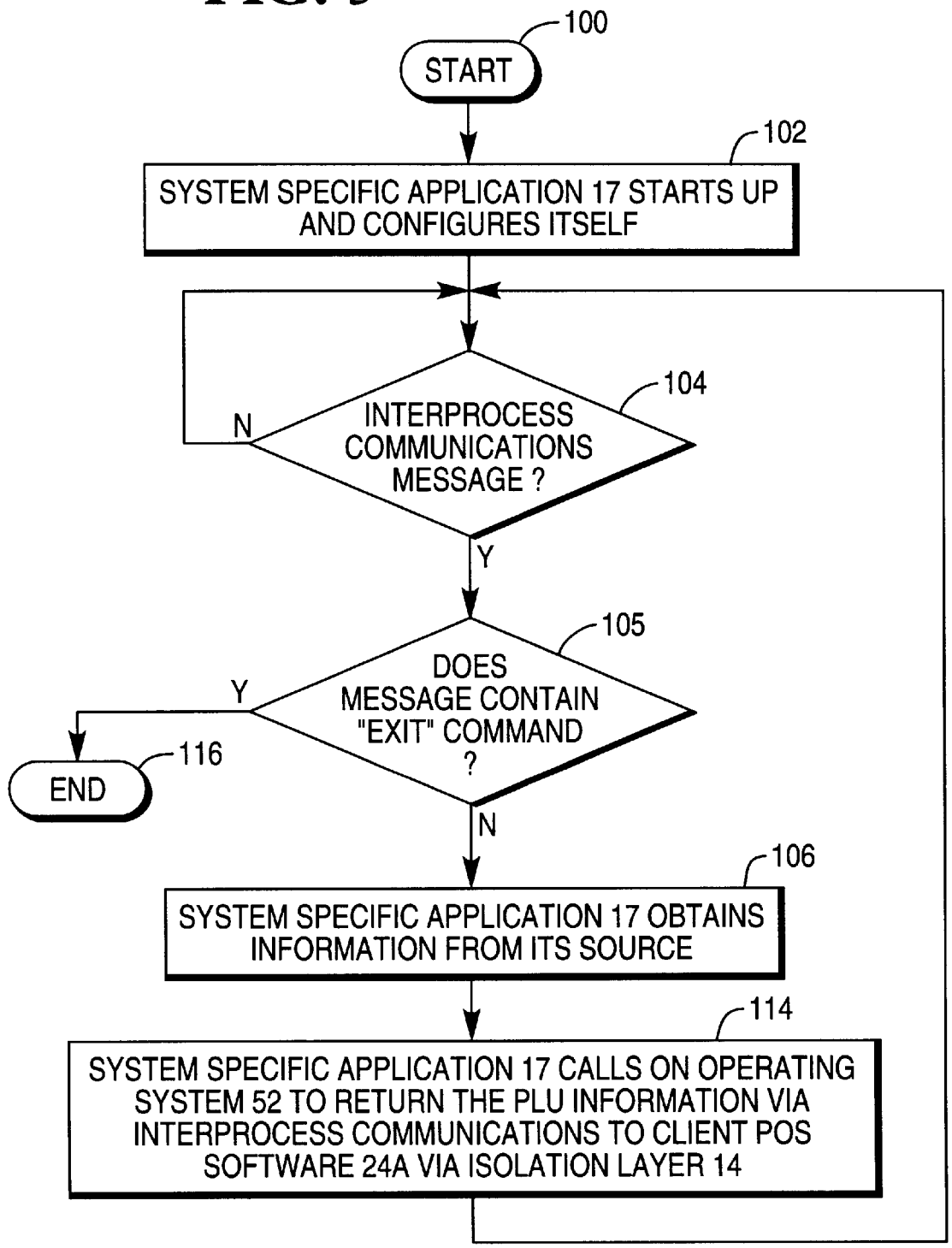
FIG. 5 is a flow diagram illustrating operation of a system specific application and, in particular, a method of transferring information from the system specific application to the client POS software through the isolation layer.

Referring now to FIG. 5, operation of a system specific application 17 is illustrated in detail, beginning with START 100. In particular, operation illustrates a method of transferring information between a terminal 22A and host computer system 12 through isolation layer 14.

In step 102, a system specific application 17 starts up and configures itself.

In step 104, system specific application 17 waits for an interprocess communications message from isolation layer 14. Interprocess communication services (e.g., "queues" for UNIX, threads or pipes for OS/2) are provided by the operating system executed by host computer system 12.

Isolation layer 14 calls on the operating system to send a request from client POS software 24A to system specific application 17. Client POS software 24A issues a call to isolation layer 14, instructing isolation layer 14 to perform a routine provided by isolation layer 14 and related to the purpose of system specific application 17.

For example, when system specific application 17 is PLU file reader software 40, the routine would be a "read direct" routine within isolation layer 14. Isolation layer 14 calls on the operating system to send the interprocess communications message to system specific application 17.

If such a message is received, system specific application 17 determines whether the interprocess communications message contains an "exit" command in step 105. If it does, system specific application 17 terminates in step 116.

If the interprocess communications message does not contain an "exit" command, system specific application 17 obtains the information from its source in step 106. For example, if system specific application 17 is PLU file reader software 40, system specific application 17 uses operating system 52 to obtain the information from PLU file 20.

In step 114, system specific application 17 calls on the operating system to return the information via interprocess communications to the client POS software 24A via isolation layer 14. System specific application 17 returns to a waiting state in step 104.

After system specific application 17 sends the information to isolation layer 14, isolation layer 14 passes the information to client POS software 24A. Client POS software application 24A can then display the information, compare the information, or otherwise examine the information in accordance with the functions of client POS software 24A.

Although the present invention has been described with particular reference to certain preferred embodiments thereof, variations and modifications of the present invention can be effected within the spirit and scope of the following claims.

What is claimed is:

1. A transaction system comprising:
   a client computer system provided by a first seller of computer systems, including a client software application;
   a server computer system provided by a second seller of computer systems different from the first seller of computer systems, including a server software application which provides information from the server computer system to the client computer system and isolation layer software which facilitates communication between the client software application and the server software application to transfer the information.

2. A transaction system comprising:
   a server computer system provided by a first seller of computer systems, including a server software application;
   a client computer system provided by a second seller of computer systems different from the first seller of computer systems, including a client software application which obtains information from the server computer system and isolation layer software which facilitates communication between the client software application and the server software application to transfer the information.

3. A method of transferring information between a first software application and a second software application comprising the steps of:
   (a) providing the first software application by a first company;
   (b) providing the second software application by a second company different from the first company;
   (c) executing the first software application by a first computer;
   (d) executing the second software application by a second computer different from the first computer;
   (e) providing an isolation layer having hooks into the second software application;
   (f) executing the isolation layer; and
   (g) establishing communication between the first software application and the second software application by the isolation layer to transfer the information.

4. The method as recited in claim 3, wherein step f comprises the substep of:

(f) executing the isolation layer by the first computer.

5. The method as recited in claim 3, wherein step f comprises the substep of:

(f) executing the isolation layer by the second computer.

6. A method of transferring information between a client software application and a server software application comprising the steps of:

(a) installing a client computer by a first company;

(b) providing and installing the client software application by the first company;

(c) installing a server computer by a second company different from the first company after installation of the client computer and the client software by the first company;

(d) providing and installing the server software application by the second company;

(e) providing and installing an isolation layer having hooks into the server software application by the second company;

(f) executing the client software application by the client computer;

(g) executing the server software application and the isolation layer by the server computer; and (h) establishing communication between the client software application and the server software application by the isolation layer to transfer the information.

7. A method of transferring information between a client software application and a server software application comprising the steps of:

(a) installing a server computer by a first company;

(b) providing and installing the server software application by the first company;

(c) installing a client computer by a second company different from the first company after installation of the server computer and the server software by the first company;

(d) providing and installing the client software application by the second company;

(e) providing and installing an isolation layer having hooks into the server software application by the second company;

(f) executing the client software application and the isolation layer by the client computer;

(g) executing the server software application by the server computer; and (h) establishing communication between the client software application and the server software application by the isolation layer to transfer the information.

8. A method of obtaining information for a client software application from a server software application comprising the steps of:

(a) providing the client software application from a first company;

(b) providing a server software application for accessing the information by a second company different from the first company;

(c) providing an isolation layer between the client software application and the server software application;

(d) sending a call for the information to the isolation layer by the client software application;

(e) sending a request message for the information to the server software application by the isolation layer;

(f) instructing control software to obtain the information by the server software application;

(g) sending the information to the isolation layer by the server software application; and (h) sending the information to the client software application by the isolation layer.

* * * * *